United States Patent [19]

Zargar

[11] Patent Number: 5,815,829
[45] Date of Patent: Sep. 29, 1998

[54] JOB COST ACCOUNTING DATA COMPRESSION AND INDEXING SYSTEM AND METHODS FOR DOING THE SAME

[76] Inventor: Dara Zargar, 60 W. 75th St. Apt. 6A, New York, N.Y. 10023

[21] Appl. No.: 504,223

[22] Filed: Jul. 19, 1995

[51] Int. Cl.$^6$ .................................................. G06F 7/00
[52] U.S. Cl. .................................... 705/30; 705/32
[58] Field of Search .................... 395/230, 207, 395/232, 236, 764–5, 788, 772, 939, 941

[56] References Cited

U.S. PATENT DOCUMENTS

| | | |
|---|---|---|
| 4,221,003 | 9/1980 | Chang et al. . |
| 4,606,002 | 8/1986 | Waisman et al. . |
| 4,989,141 | 1/1991 | Lyons et al. .............................. 395/236 |
| 5,016,170 | 5/1991 | Pollalis .................................... 395/207 |
| 5,117,356 | 5/1992 | Marks ...................................... 395/230 |
| 5,133,068 | 7/1992 | Crus et al. . |
| 5,224,034 | 6/1993 | Katz et al. ............................... 395/207 |
| 5,241,648 | 8/1993 | Cheng et al. . |
| 5,241,693 | 8/1993 | Schelvis . |
| 5,359,724 | 10/1994 | Earle ...................................... 395/621 |
| 5,359,729 | 10/1994 | Yarnel et al. . |
| 5,369,778 | 11/1994 | San Soucie et al. . |
| 5,418,713 | 5/1995 | Allen ...................................... 395/232 |

*Primary Examiner*—Gail O. Hayes
*Assistant Examiner*—Phillip Groutt
*Attorney, Agent, or Firm*—Richard B. Klar

[57] ABSTRACT

The present invention relates to a method and system of data compression and indexing strategies for accounting software. Financial records are tracked to single job apart from its general ledger and incorporated into a single general ledger entry. The system provides flexibility for incorporating various user-defined numbering systems that may be used for recording financial transactions.

24 Claims, 14 Drawing Sheets

| LINE | CATEGORY | AMOUNT |
| --- | --- | --- |
| 1100 | STORY & CONTINUITY | 0.00 |
| 1101 | Writers-Script | 0.00 |
| 1102 | Secretaries | 0.00 |
| 1103 | Researchers | 0.00 |
| 1104 | Story Editor | 0.00 |
| 1105 | Script Timing | 0.00 |
| 1106 | Royalties | 0.00 |
| 1121 | Story Rights | 0.00 |
| 1122 | Photcopy (Script) | 0.00 |
| 1123 | Supplies | 0.00 |
| 1124 | Script Delivery | 0.00 |
| 1181 | Other Costs | 0.00 |
| 1199 | Payroll Taxes & Fringes | 0.00 |
| 1200 | PRODUCERS | 0.00 |
| 1201 | Executive Producer | 0.00 |
| 1202 | Producer | 0.00 |
| 1203 | Associate Producer | 0.00 |
| 1204 | Production Representative | 0.00 |
| 1205 | Assistants & Secretaries | 0.00 |
| 1281 | Other Costs | 0.00 |
| 1300 | DIRECTION | 0.00 |
| 1301 | Director | 0.00 |
| 1302 | Assistant To Director | 0.00 |
| 1303 | Consultants | 0.00 |
| 1304 | Secretary/Typist | 0.00 |
| 1381 | Other Costs | 0.00 |
| 1400 | CAST | 0.00 |
| 1401 | Stars | 0.00 |
| 1402 | Supporting Cast | 0.00 |
| 1403 | Day Players | 0.00 |
| 1404 | Stunt Coordinator | 0.00 |
| 1405 | Stunts & Pilots | 0.00 |
| 1406 | Stunt Adjustments | 0.00 |
| 1407 | OT, Penalties, Looping | 0.00 |
| 1421 | Fittings | 0.00 |
| 1481 | Other Costs | 0.00 |
| 1500 | TRAVELING & LIVING | 0.00 |
| 1501 | Travel | 0.00 |
| 1522 | Living | 0.00 |
| etc. | | |
| etc. | | |
| etc. | | |

FIGURE 1A

FIGURE 1B
Sample Data Entry Screen

VOUCHER

Name: East Coast Company  Key: EASTCO

INVOICE
Number: 086453582
Inv Date: 03/17/95
Due Date: 04/20/95
Amount: 0.00
Terms:
Disc Date: / /

POSTING
Job: 95513
Type: C
AP Date: 04/06/95
Stamp/PO #: 27336
Connect To: #
1099 <R>ent or <F>ees Memo: Film

PAYMENT
Account: 1
Check #: 100069
Chk Date: 04/10/95
Chk Total: 3275.22

| CODE A | CODE B | NOTE | PAID |
|--------|--------|------|------|
| 95513  | 211    | FILM | 3342.06 |
|        | 6499   | DISCOUNT | -66.84 |
|        |        |      |      |
|        |        |      |      |
|        |        |      |      |

Close    Save

Figure 2

SYSTEM FLOWCHART

FIGURE 3

PARSE_A ROUTINE - Flowchart

FIGURE 4
PARSE_B ROUTINE - Flowchart

FIG 4A

```
*********************************************************************
* PARSE_B.PRG
* RECIEVES: string_b (string)
* ACTION: parses string_b and identifies substrings
* RETURNS (modifies):
*     sstring (array)
*     string_b  (parameter)
*     m.gl
*     m.phase
*     m.task
*     m.dept
*     m.initials
*     CALLS DISSECT.PRG, which returns the following:
*          - substrings in sstring(sidx,1)
*          - character types in sstring(sidx,2)
*          - special character prefixes in sstring(sidx,3)
*********************************************************************
PROCEDURE parse_b
PARAMETER string_b string_b = UPPER(string_b)
m.error = .F.
PRIVATE sidx, jobcost
sidx = 1
jobcost = .F.
PUBLIC sstring
DIMENSION sstring(5,3)
STORE '' TO sstring DO dissect WITH string_b
DO q_jobcost IF jobcost
      DO jcparse
ELSE
      DO glparse
ENDIF

SHOW GETS

RETURN
```

FIG 4A

```
*********************************************
*    Q_JOBCOST
*        identifies type of code according to rules
*********************************************
PROCEDURE q_jobcost
* RULE: prefix special chars flag a JOB COST code; others are GL CODES
    IF 'S' $ sstring(1,2)
         jobcost = .T.
    ENDIF
* RULE: if no job# then jobcost = .F.
    IF LEN(m.job) = 0 .AND. jobcost = .T.
         m.error = .T.
         jobcost = .F.
    ENDIF
RETURN

*********************************************************************
*    JCPARSE
*        assign substrings to variables for job cost codes
*********************************************************************
PROCEDURE JCPARSE
m.gl = 'JOB COST'
* loop through substrings in sstring() array
DO WHILE sidx <= 4
    * discard blank strings
    IF LEN(sstring(sidx,1)) = 0
         sidx = sidx + 1
         LOOP
    ENDIF
    * identify and assign the current substring
    DO CASE
         CASE sidx = 1
              IF 'A' $ sstring(sidx,2)
                   m.phase = sstring(sidx,1)
              ELSE
                   m.task = sstring(sidx,1)
              ENDIF
         CASE sidx = 2
              IF sstring(sidx,3) = '.'
                   m.task = sstring(sidx,1)
              ELSE
                   m.dept = sstring(sidx,1)
              ENDIF
         CASE sidx = 3
              m.dept = sstring(sidx,1)
         CASE sidx = 4
    ENDCASE
    * increment array/loop counter
    sidx = sidx + 1
ENDDO

RETURN
```

FIG 4A

```
************************************************************************
*     GLPARSE
*         assign substrings to variables for gl cost codes
************************************************************************
PROCEDURE GLPARSE

* loop through substrings in sstring() array
DO WHILE sidx <= 4

* discard blank strings
      IF LEN(sstring(sidx,1)) = 0
            sidx = sidx + 1
            LOOP
      ENDIF

DO CASE
            CASE sidx = 1
                  m.gl = sstring(sidx,1)
            CASE sidx = 2
                  DO CASE
                        CASE sstring(sidx,3) = '.'
                              m.dept = sstring(sidx,1)
                        CASE 'A' $ sstring(sidx,2)
                              m.initials = sstring(sidx,1)
                  ENDCASE
            CASE sidx = 3
                  DO CASE
                        CASE sstring(sidx,3) = '.'
                              m.dept = sstring(sidx,1)
                        CASE 'A' $ sstring(sidx,2)
                              m.initials = sstring(sidx,1)
                  ENDCASE
            CASE sidx = 4
      ENDCASE

* increment array/loop counter
      sidx = sidx + 1

ENDDO

RETURN
```

FIGURE 5
DISSECT ROUTINE - Flowchart

FIGURE 5A

```
***********************************************************************
* DISSECT.PRG
* RECIEVES: a string comprised of alphanumeric substrings separated
*    by special characters
* ACTION: parses string into significant substrings;
*    substrings are saved in sstring(sidx,1)
*    special conditions are noted in sstring(sidx,2)
*    special characters are saved in sstring(sidx,3)
* RETURNS (modifies):  PUBLIC 'sstring'
***********************************************************************
PROCEDURE DISSECT
PARAMETER instring
instring = LTRIM(instring)
PRIVATE position, thischar, ctype, lctype, sidx
position = 0              && current character position in instring
thischar = ' '            && current character from instring
ctype = 'B'               && type of current character (B = begin)
lctype = 'B'              && type of last character    (B = begin)
sidx = 0                  && array index for sstring DO WHILE position < LEN(instring)
       * get next character, save last ctype
       position = position + 1
       thischar = SUBSTR(instring, position, 1)
       lctype = ctype
       * identify type of character
       DO CASE
              CASE (ASC(thischar)>=48) .AND. (ASC(thischar)<=57)
                    ctype = 'D'
              CASE ISALPHA(thischar)
                    ctype = 'A'
              OTHERWISE
                    ctype = 'S'
       ENDCASE
       * test for beginning of new substring
       IF (ctype = 'D' .OR. ctype = 'A') .AND. (ctype <> lctype)
              sidx = sidx + 1
       ENDIF
       * save characters and types in appropriate variables
       IF ctype = 'S'
              sstring(sidx+1,2) = ctype
              sstring(sidx+1,3) = thischar
              * special character saved and noted; note that sidx has not
              * yet been incremented, so the commands work on sidx+1; only
              * one prefix character is significant, so duplicates are
              * updated, not added.
       ELSE
              * add new significant character to current 'sstring'
              sstring(sidx,1) = sstring(sidx,1) + thischar
              sstring(sidx,2) = sstring(sidx,2) + ctype
       ENDIF
ENDDO
RETURN
```

FIGURE 6
SAMPLE DATA ENTRY FORMAT CODE DEFINITION

|  | FORMAT | LENGTH |
|---|---|---|
| JOB TABLE: | | |
|     INTELLIGENT JOB NUMBER | JJJJJ | 9 |
|     JOB NAME | NAME | 30 |
|     JOB TYPE (FOLLOWING PULLED FROM JOBTYPE TABLE) | AICP | 5 |
|         DIVISION | DIV | 3 |
|             DEFAULT JOB COST GENERAL LEDGER ACCOUNT # | 7120 | 12 |
|             DEFAULT JOB INCOME GENERAL LEDGER ACCOUNT # | 6100 | 12 |
|             BID/BUDGET LINE # MASK | NNN | 12 |
| JOB TYPE TABLE | | |
|     JOBTYPE | AICP | 5 |
|     DIVISION | DIV | 3 |
|     DEFAULT JOB COST GENERAL LEDGER ACCOUNT # | 7120 | 12 |
|     DEFAULT JOB INCOME GENERAL LEDGER ACCOUNT # | 6100 | 12 |
|     CORRESPONDING BID/BUDGET LINE # MASK | NNN | 12 |
| BID/BUDGET TABLE | | |
|     JOB # | JJJJJ | 9 |
|     TASK: LINE # (STRUCTUREE IN ACCORDANCE | | |
|         WITH MASK DEFINED IN JOB TABLE | NNN | 12 |
|     PHASE: TASK REGROUPING - TO SUBTOTAL ABOVE LINES | A TO K | 1 |
|     AMOUNT OF BID/BUDGET FOR CORRESPONDING LINE # | $ AMOUNT | 15 |
| CHART OF ACCOUNTS TABLE | | |
|     GENERAL LEDGER ACCOUNT NUMBER | GGGG | 12 |
|     DIVISION | DIV | 3 |
|     DEPARTMENT | DEP | 4 |
|     FINANCIAL REGROUPING | | |
| COST ALLOCATIONS (ALSO CALLED DISTRIBUTIONS OR SPLITS) | | |
|     CODE A | | |
|         DIVISION - JOB NUMBER | DIV\JJJJJ | |
|     CODE B | | |
|         GENERAL LEDGER ACCOUNT #, | G\D\I | 25 |
|             DEPARTMENT, INITIALS | | |
|         OR: | | |
|         BID/BUDGET LINE # - DEPARTMENT | \N\D | 25 |
|     FOR WHAT | LABEL | 25 |
|     ALLOCATION AMOUNT | $ AMOUNT | 15 |

FIGURE 7
SAMPLE JOB TABLE

| JOB | NAME | JOBTYPE | MASK |
|---|---|---|---|
| 21001 | OAK INDUSTRIES | AICP | /N/D |
| 21002 | CARIBOU FILMS | AICE | N/D/I |
| 21003 | AIR MOBIUS | AICP | /N/D |
| 25001 | THE ROCK RANGERS | UDEF | D/N/I |
| 25002 | FOLETTE'S | AICP | /N/D |
| 25003 | SHARPER COLAS | AICP | /N/D |
| 25004 | MICROBEACH | UDEF | D/N/I |
| 25005 | PREROX | AICE | N/D/I |
| 25006 | STRAPLETS | AICP | /N/D |
| 31004 | PARASONIC | AICP | /N/D |
| 31005 | CANAL STREET JOURNAL | UDEF | D/N/I |
| 35007 | JUDO FILM | AICE | N/D/I |
| 35008 | LEDGERS OFFICE STORE | UDEF | D/N/I |
| 35009 | SONNY'S | AICP | /N/D |
| 35010 | O'DONNELL'S | AICP | /N/D |
| 35011 | RERING | UDEF | D/N/I |
| 35012 | XAT | UDEF | D/N/I |
| 35013 | NILE NOISE MAKERS | AICE | N/D/I |
| 37001 | HARIETT PRITCHARD | UDEF | D/N/I |
| 37002 | MONARCH BUTTERFLIES | AICP | /N/D |
| B0234 | CHRONIC COLA | AICP | /N/D |

FIGURE 8
SAMPLE DATA ENTRY AND RESULTING DERIVED INFORMATION

| USER ENTERS... | | SYSTEM DERIVES... | | | | | | |
|---|---|---|---|---|---|---|---|---|
| CODE_A | CODE_B | DIVISION | JOB | GL | DEPT | PHASE | TASK | INITIALS |
| 354547 | \12 | | 354547 | JOB COST | | | 12 | |
| \ | 125.400\DZ | | | 125 | 400 | | | DZ |
| 35 | 125 | 35 | | 125 | | | | |
| 35 | 125.400\JLS | 35 | | 125 | 400 | | | JLS |
| 454001T | \FX.35\400 | | 454001T | JOB COST | 400 | FX | 35 | |
| 44\103 | \KL.78\456 | 44 | 103 | JOB COST | 456 | KL | 78 | |
| 34\456Y | \DX.56\400 | 34 | 456Y | JOB COST | 400 | DX | 56 | |
| 44\103 | \FX.35\456 | 44 | 103 | JOB COST | 456 | FX | 35 | |
| 44 | 56.234\JLS | 44 | | 56 | 234 | | | JLS |
| 12/3567 | /LT.56\400 | 12 | 3567 | JOB COST | 400 | LT | 56 | |
| 44\106 | \FX.35\354 | 44 | 106 | JOB COST | 354 | FX | 35 | |
| 44\106 | /GH.67\449 | 44 | 106 | JOB COST | 449 | GH | 67 | |
| 98 | 45.988\JLS | 98 | | 45 | 988 | | | JLS |
| | 125.78\AJ | | | 125 | 78 | | | AJ |
| 45\890 | /KJ.43/89 | 45 | 890 | JOB COST | 89 | KJ | 43 | |
| 45\123 | \JH.56/678 | 45 | 123 | JOB COST | 678 | JH | 56 | |
| 78 | 134.56/BWS | 78 | | 134 | 56 | | | BWS |
| | 78.908\DZ | | | 78 | 908 | | | DZ |
| 44\78 | \SDF.90/IO | 44 | 78 | JOB COST | IO | SDF | 90 | |
| 44 | 334.987\JLS | 44 | | 334 | 987 | | | JLS |
| 55\104 | \FX.45\567 | 55 | 104 | JOB COST | 567 | FX | 45 | |

JOB COST ACCOUNTING DATA COMPRESSION AND INDEXING SYSTEM AND METHODS FOR DOING THE SAME

BACKGROUND OF THE INVENTION

1. Field of the Invention

The present invention relates to a method and a system of data compression and indexing strategies for accounting software. This system and method is particularly suited to entities whose operation involves the completion of projects (JOBS) for clients, as in the entertainment, advertising and construction industries; bookkeeping of this sort is known as JOB COST ACCOUNTING. The system and method is also geared to entities organized into various divisions and departments.

2. The Prior Art

Bookkeeping strategies and software for job cost accounting are known in the prior art. The task is inherently complex, and little progress has been made in simplifying the entry of information into such systems.

Current practice involves making an entry in the general ledger for each financial transaction which occurs. Each of these entries include numerous pieces of identifying information. In the case of job costs, a great deal of this information is redundant, since two costs associated with the same job have much identifying information in common.

Coding formats used to record financial transactions vary from one organization to another, from one industry to another and from one transaction to another. Prior accounting software systems are unable to adapt to existing code formats used by an organization or industry; users of the system must rearrange their operation to adapt to the software instead.

It would be desirable to implement a system and method of performing the same whereby the entry of information is simplified, where redundant general ledger entries are minimized, and where the system can adapt to a variety of existing coding formats.

SUMMARY OF THE INVENTION

It is therefore a principle object of the present invention to provide a simplified system and method of data entry for financial records. This is accomplished by reducing the number of necessary data entry fields from perhaps as many as nine to two; the method and system for accomplishing this is described in detail below.

Still another object of the invention is to eliminate redundant general ledger entries. This is accomplished by tracking the records pertaining to a single job separately from the general ledger, then incorporating the job as a whole into a single general ledger entry.

Yet another object of the invention is to provide a method and a system with the flexibility necessary to incorporate various coding formats used to record financial transactions.

Further objects of the present invention will become more readily apparent in the description and drawings provided.

BRIEF DESCRIPTION OF THE DRAWINGS

FIG. 3A is the software program corresponding to the flow chart for the Parse A routine in FIG. 3 as coded in FoxPro software language (FoxPro Database Management System is a Registered Trademark of Microsoft Corporation);

FIG. 5A is the software program corresponding to the DISSECT Routine as shown in FIG. 5 as coded in FoxPro Software language;

DETAILED DESCRIPTION OF THE PREFERRED EMBODIMENT(S)

1. The Drawings

The drawings of FIGS. 1–8 include sample data entry screens from a software implementation of the invention, sample tables (computer data structures) used for recording the information used by and generated by the system, and flow charts used to illustrate the mechanisms (known in computer terminology as ALGORITHMS) by which the objectives of the invention are accomplished.

Also included is an example of how the invention may be implemented using a particular software language FoxPro (FoxPro Database Management System is a Registered Trademark of Microsoft Corporation). It should be understood that the algorithms used to accomplish the objectives of the invention exist independently of this particular computer language and may be implemented using other computer languages.

2. Nomenclature

Certain nomenclature associated with JOB COST ACCOUNTING and computer implementations of accounting systems is defined below to assist in understanding the present invention.

DATA—Information in the form of numbers or alphanumeric characters which can be manipulated by a computer. Data can be captured (or provided) using punch tapes, punch cards, keyboards, keypads, bar codes, magnetic strips, magnetic floppy disks and hard disks and various other methods. Data can be viewed using LCD devices, television screens, computer monitors, or computer printouts. Data can be stored on magnetic tapes, magnetic floppy disks and hard disks, PCMCIA flash cards, CD-ROM and a variety of other media. Data can be transmitted from one computer system to another through phone lines via modems and through network cables.

TABLE—A data structure used by computers to organize and store data.

GENERAL LEDGER—A book containing pages (accounts) to which debits and credits are posted from different lists of original entries. In computer terms the book is a master table and the lists are associated tables.

CHART OF ACCOUNTS—Types of financial transactions encountered during the operation of a company are categorized and assigned an identification code. This code is used in the GENERAL LEDGER to identify the nature of a particular transaction. A code number from the CHART OF ACCOUNTS used in the GENERAL LEDGER to record a particular transaction is referred to as a GENERAL LEDGER ACCOUNT NUMBER, or "GL NUMBER."

DIVISION, DEPARTMENT—A business entity may be divided into organizational units called DIVISIONS, which are further divided into DEPARTMENTS. Records of financial transactions include identification of the DIVISION and/or DEPARTMENT with which the transaction is associated.

INITIALS—The initials of the individuals involved in the bookkeeping process are often recorded as reference information.

JOB—A project undertaken by the entity for a client.

JOB NUMBER—An alphanumeric code used to uniquely identify a particular JOB and all financial information pertaining to that job. The format for JOB NUMBERS is defined by the user and varies from company to company; a well-designed system must accommodate JOB NUMBERS in a variety of formats.

JOB TYPE—Jobs vary in type by the nature of the project involved. A company may identify several types of jobs they perform, and assign an alphanumeric code to differentiate between them. This code is then used to identify the nature of a particular job.

PHASE—A JOB is completed in a series of stages or PHASES. In the case of the Entertainment industry, jobs proceed through Pre-Production, Production, and Post-Production PHASES. Each PHASE is further subdivided into TASKS, defined below.

TASK—A particular activity related to the completion of a JOB. JOB COSTS are keyed to the TASK with which they are associated using the BID/BUDGET TABLE, described below.

BID/BUDGET TABLE—Similar to a CHART OF ACCOUNTS. Each TASK is assigned an alphanumeric code called a LINE NUMBER. This code is used to identify the nature of a particular expense related to a job. TASKS are grouped by PHASE, and the coding scheme for LINE NUMBERS reflects this arrangement. Different JOB TYPES involve different categories of expenses, and therefore separate BID/BUDGET TABLES are associated with different Job Types.

Figure 1:
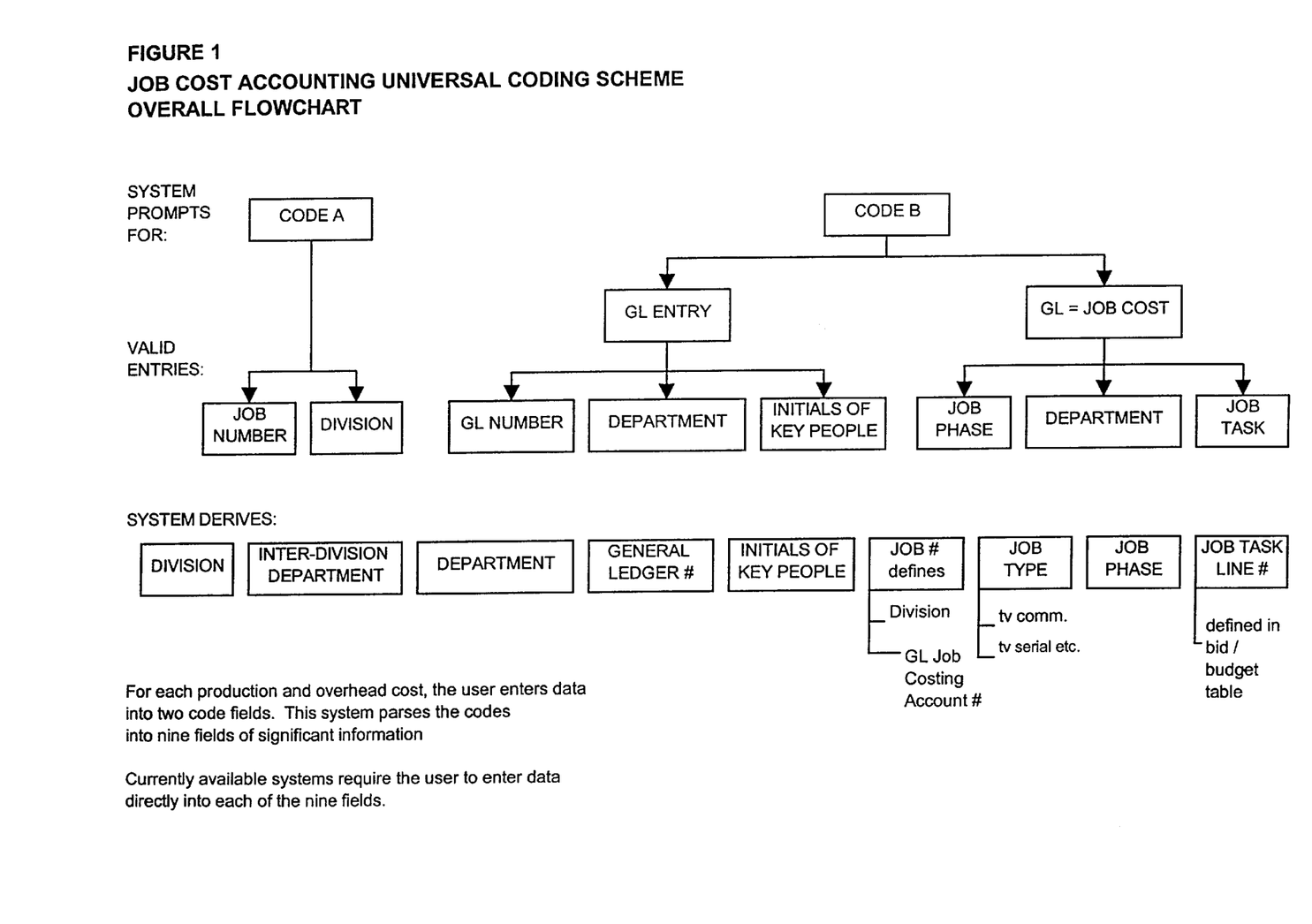
FIG. 1 is a chart showing diagrammatically the overall system of the present invention in terms of system prompts and what the system posts.
Figure 1A:
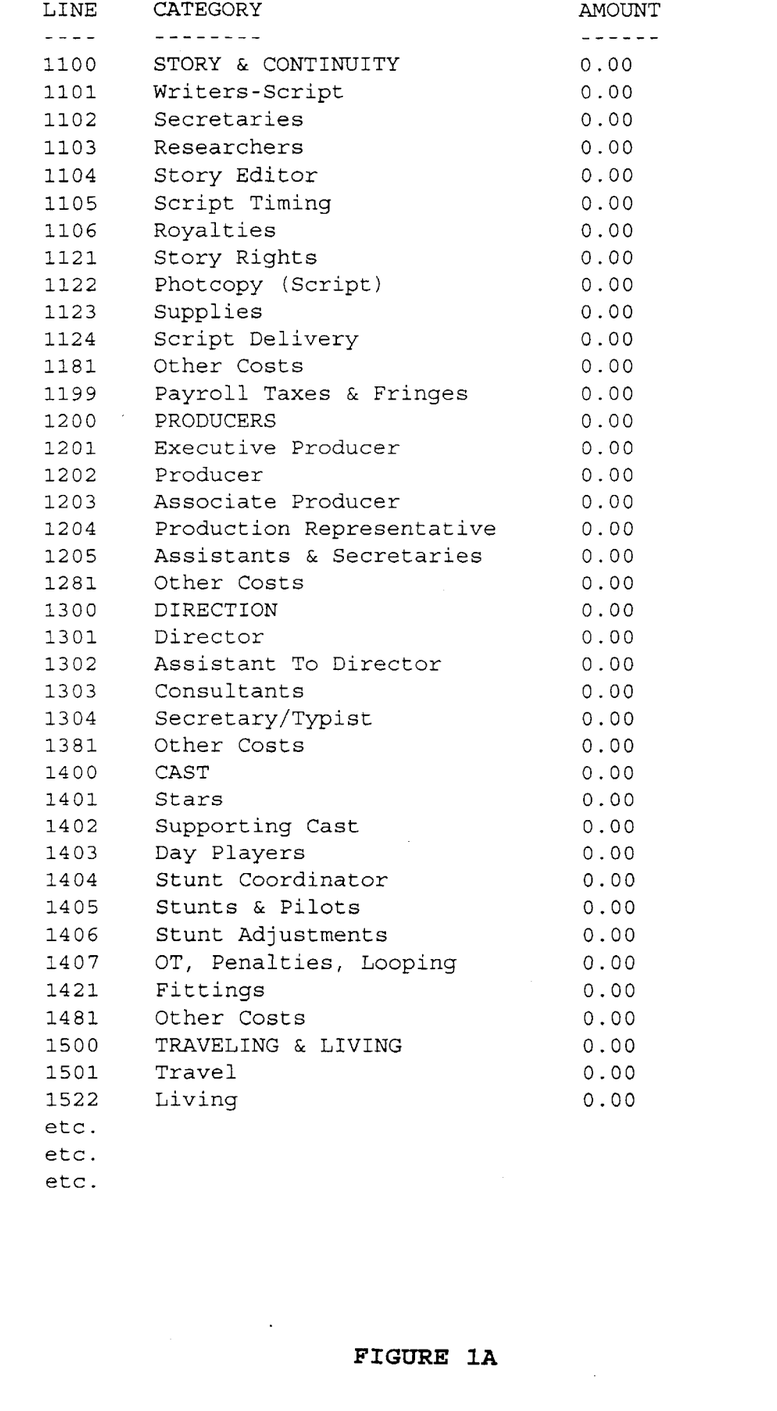
FIG. 1A is a sample budget or BID table illustrating by line number various phases of a job and costs allocated to each phase of a job.

A sample BID/BUDGET TABLE is shown in FIG. 1A. In this example the PHASE "Story & Continuity" (LINE NUMBER 1100) has many associated TASKS—Writers, Researchers, Story Editor, etc. (LINE NUMBERS 1101–1199)

The current invention allows for different BID/BUDGET TABLES and for the variety of formats which they utilize.

3. The Present Invention

Figure 1B:
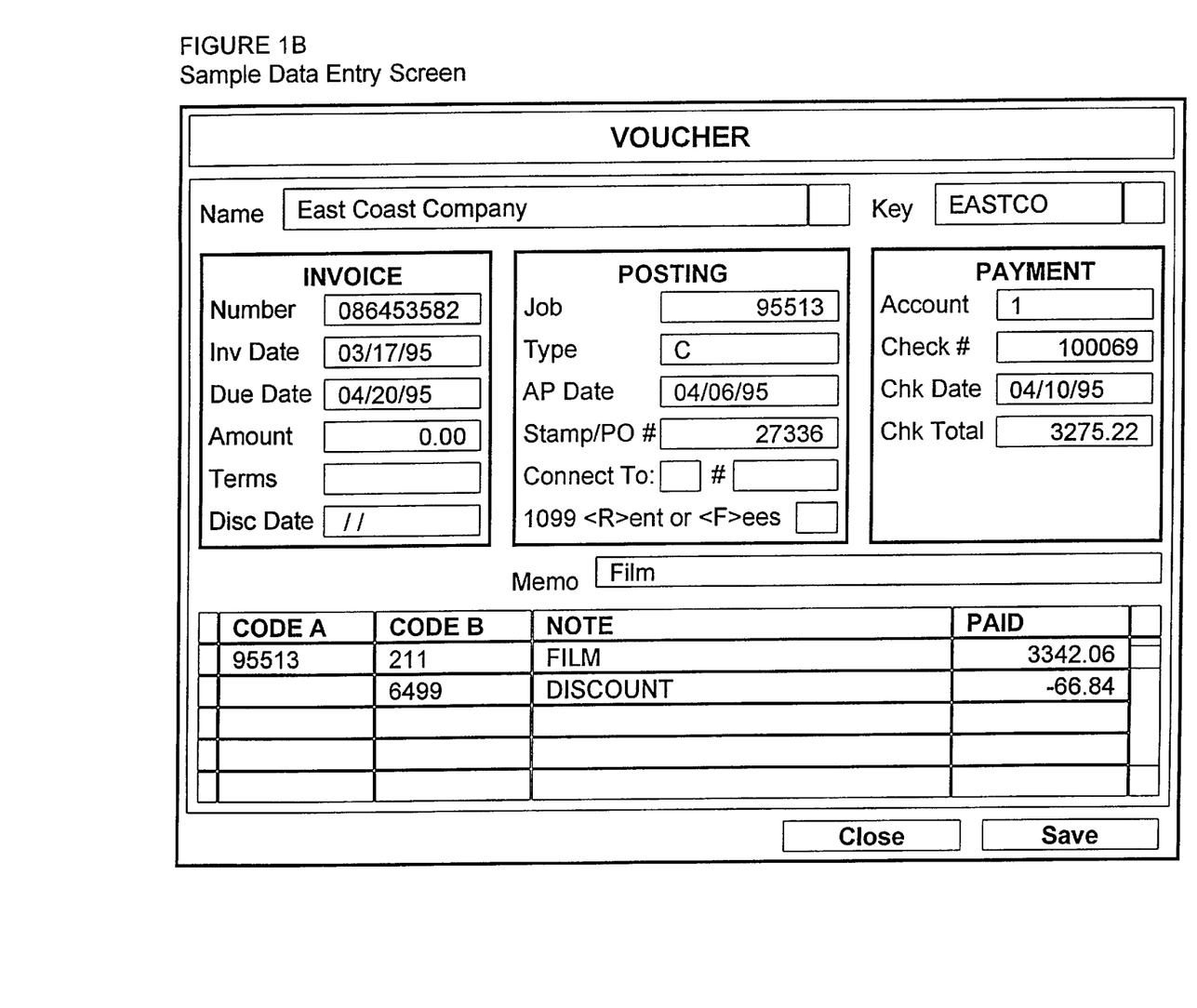
FIG. 1B is a sample data entry screen illustrating screen display by the system of job numbers and associated phase numbers and allocated costs for each job number as displayed to a user of the invention.

Referring now to the drawings in FIGS. 1–8, the present invention constitutes a component of an accounting software system and a method of performing the same in which a user of the system, while recording a financial transaction, enters a set of data into each of two related data entry fields (shown in FIG. 1) labeled CODE A and CODE B in the illustrations. Data in these two fields will be entered in a predetermined arrangement of letters, numbers, and/or special characters (#, /, \, |). These two related data entry fields are accessed from one or more data entry screen for the system, an example of which is shown in FIG. 1B.

The user may enter the following combinations of information into the CODE A field:

(leave blank)

DIVISION

JOB NUMBER

DIVISION/JOB NUMBER

The system will interpret the data entered in the CODE A field (using the mechanism described below) and then will 'prompt' (ask for) the user to enter data into the CODE B field.

The combinations of information available to the user when entering data into the CODE B field are determined by the data entered into the CODE A field. If the user entered a JOB NUMBER in the CODE A field then the system will expect data entered into the CODE B field to represent JOB COST information in one of the following combinations:

BID/BUDGET LINE NUMBER

BID/BUDGET LINE NUMBER/DEPARTMENT

If the user did NOT enter a JOB NUMBER into the CODE A field, then the system will expect data entered into the CODE B field to represent GENERAL LEDGER information in one of the following combinations:

GL NUMBER

GL NUMBER, DEPARTMENT

GL NUMBER, INITIALS

GL NUMBER, DEPARTMENT, INITIALS

The system will then interpret the data entered into the CODE B field (using the mechanism described below).

From the data entered into the CODE A and CODE B fields the system can derive up to nine significant pieces of information, as shown in FIG. 1. The mechanism for interpreting the two code fields and generating the significant information is described below.

4. The Operational System

The mechanism or "algorithm" used to accomplish the objectives of the invention is illustrated in FIGS. 2–5.

Figure 2:
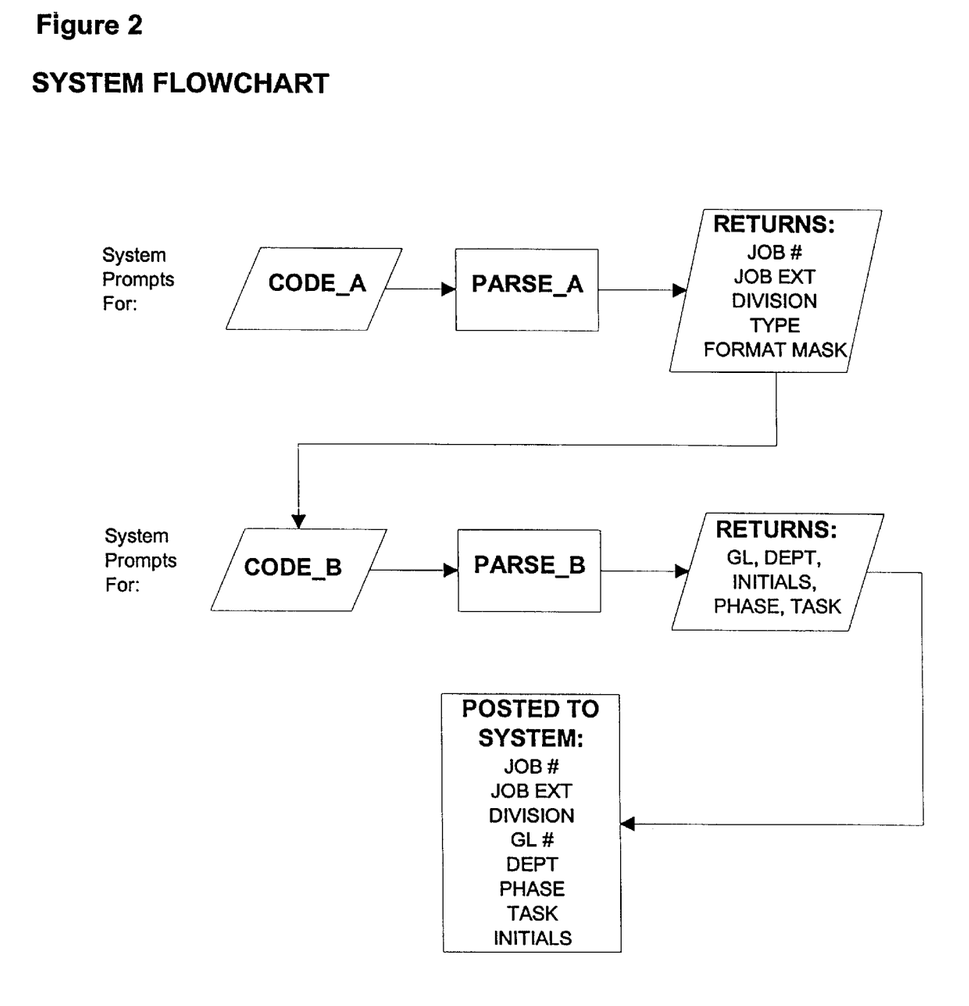
FIG. 2 is a flow chart illustrating the overall algorithm utilized by the present invention.

FIG. 2 is a flow chart representing a general overview of the algorithm. The system asks the user to enter data into the CODE A field. A routine labeled PARSE_A (detailed below) interprets the data entered in the CODE A field, making the significant pieces of information contained therein available to the system. The routine also identifies a range of possible errors in the data entered by the user, and can ask the user to re-enter the data if necessary; this process is known as "validation." The system then asks the user to enter data into the CODE B field. A routine labeled PARSE_B (detailed below) interprets the data entered in the CODE B field, again validating the data and making the significant information contained in that field available to the system. At this point all of the information necessary to track the financial transaction is available to the system and can be recorded as necessary.

Figure 3:
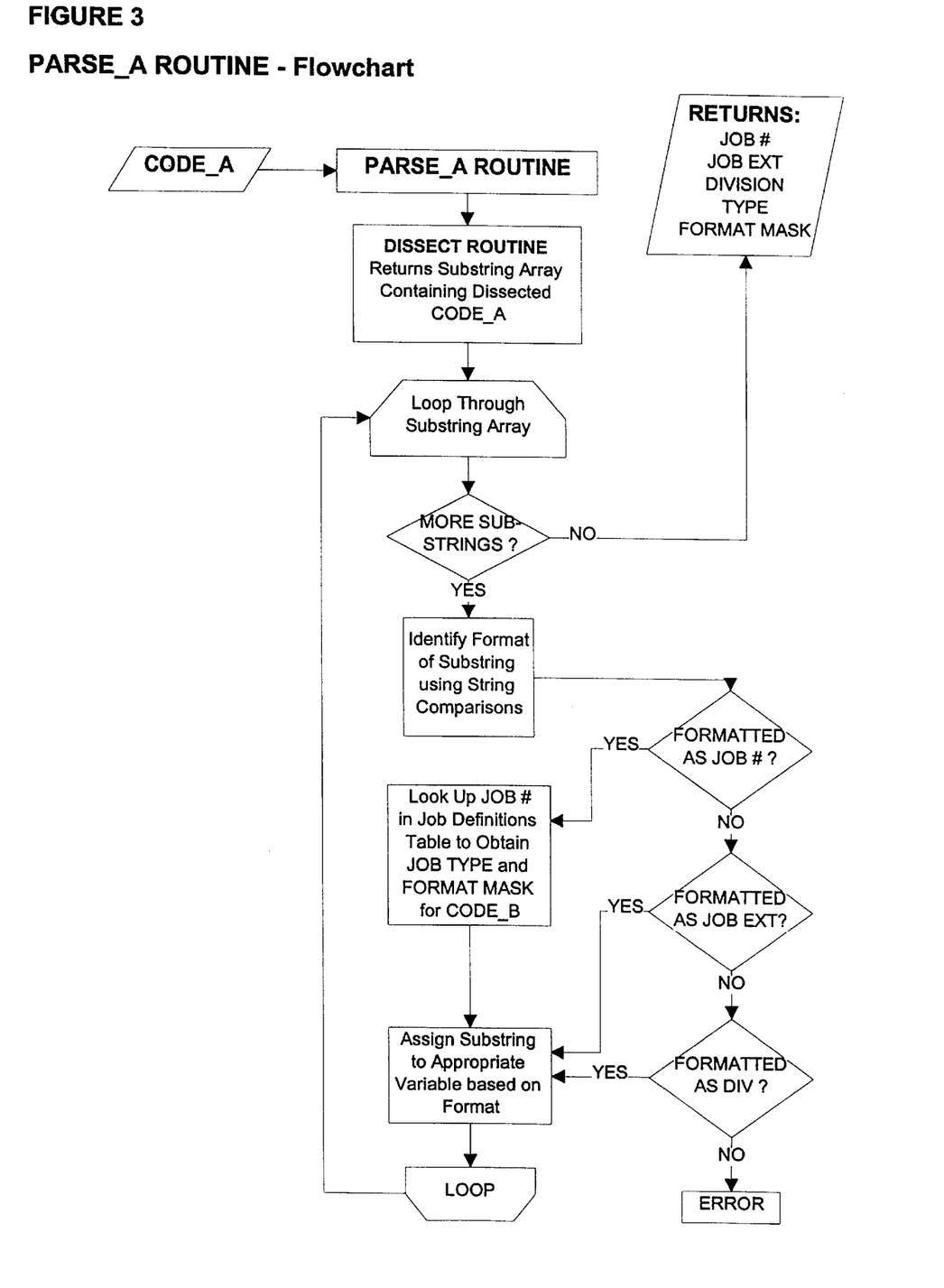
FIG. 3 is a detailed flow chart of the Parse A routine shown in FIG. 2.

FIG. 3 is a flow chart illustrating the operation of the PARSE_A routine. The code entered into the CODE A field is accepted by the routine and is first passed to another routine labeled the DISSECT ROUTINE (detailed below) which separates the data into component character strings which will be identified individually. These component strings are stored in an ARRAY along with other information necessary to identify the strings, such as the types of characters contained and any special characters which accompany the string. The array is then passed back to the PARSE_A routine, which examines and identifies each string contained therein. This is accomplished using a "loop" which allows the system to perform a series of operations (detailed below) on the first character string in the array, then the same set of operations on the second string, then the third string and so on until the last character string is reached. When the system determines that all of the sub strings in the array have been analyzed then the routine is exited.

For each character string in the array the system makes character by character comparisons to determine whether the string matches any of the predetermined formats defined for such data. First the string is compared to the defined format for a JOB NUMBER; if the string fails that test it is compared to the defined format for a DIVISION code. If both of these tests fail the system determines that the data entered is not valid, and the user can be asked to re-enter the data. When a string is identified properly it is stored by the system for later use.

If the string is identified by format as being a JOB NUMBER, then the system opens a JOB TABLE (See FIG. 7) and looks for information connected with that Job Number, such as the JOB TYPE and a format mask for LINE NUMBERS which will be used in interpreting the CODE B string in the PARSE_B routine (detailed below).

Figure 4:
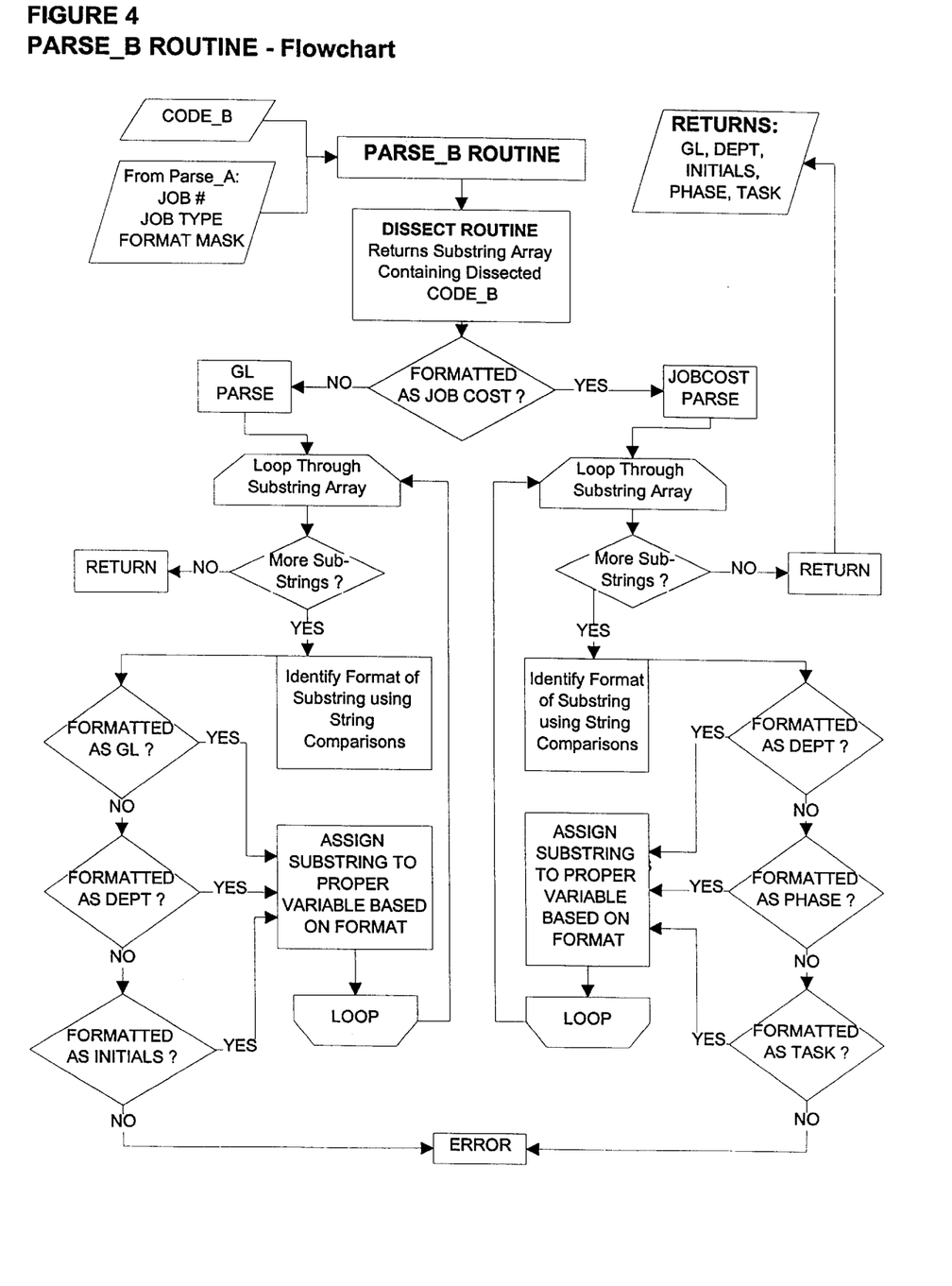
FIG. 4 is the detailed flow chart of the Parse B routine as shown in FIG. 2.
Figure 4A:
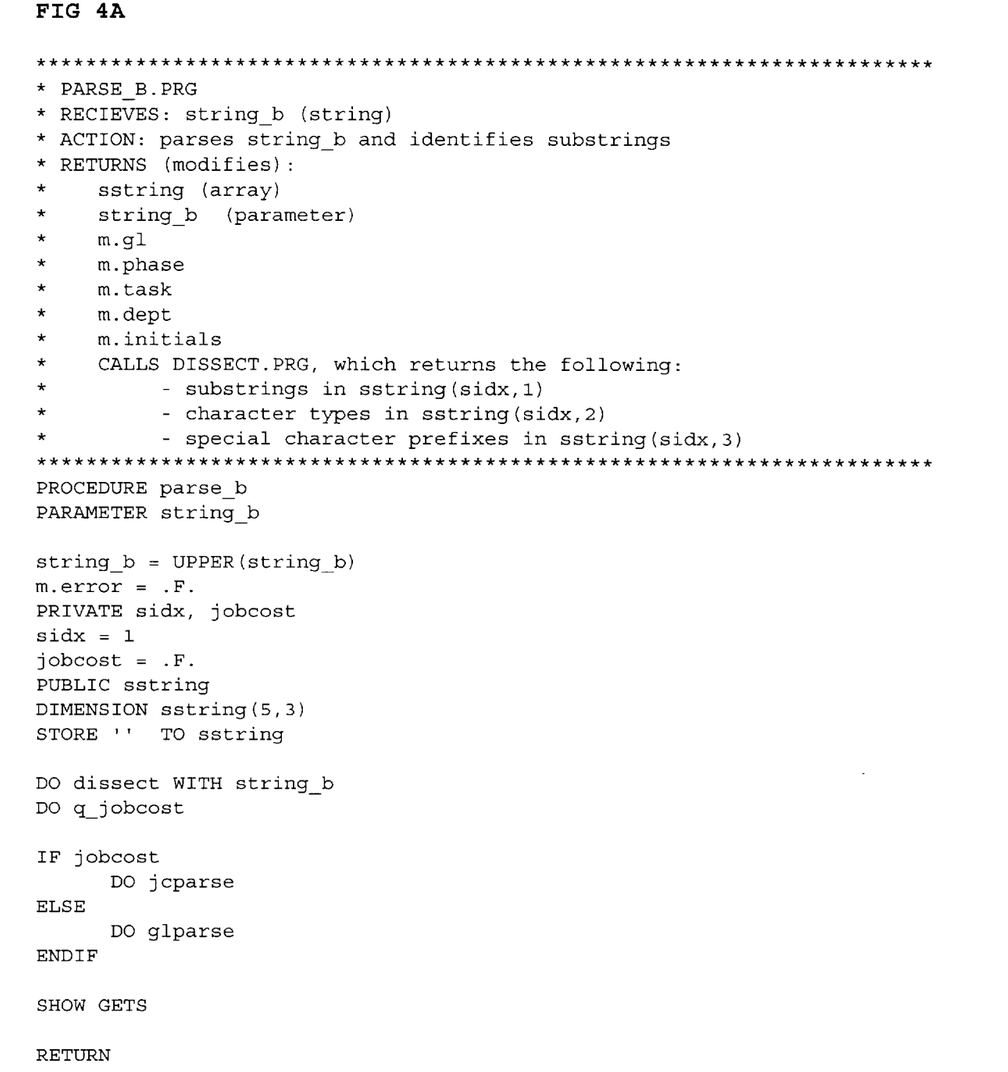
FIG. 4A is the software program corresponding to the Parse B routine in FIG. 4 as coded in FoxPro software language.

FIG. 4 is a flow chart illustrating the operation of the PARSE_B routine, whose function is very similar to the PARSE_A routine. The code entered into the CODE B field is accepted by the routine and is passed to the DISSECT ROUTINE (detailed below) which functions as before, returning an array with component strings, character types and special characters. At this point the routine performs a test: If a JOB NUMBER was found in the CODE A string then the CODE B string will be interpreted as a JOB COST; otherwise it will be interpreted as a GENERAL LEDGER ENTRY. In either case a "loop" is used to analyze and identify each string by format comparisons. Once the system determines that all of the component strings have been analyzed the PARSE_B routine is exited.

If the CODE B string is interpreted as a JOB COST, then the system will perform character by character comparisons to determine if each string is formatted as a DEPARTMENT, PHASE, or TASK code, storing the values appropriately when identified. If the string is interpreted as a GENERAL LEDGER ENTRY, then the system will look for strings formatted as GL NUMBER, DEPARTMENT, or INITIALS and store these values appropriately when identified. Again any unidentifiable strings are interpreted as invalid data, and appropriate error messages are generated.

Figure 5:
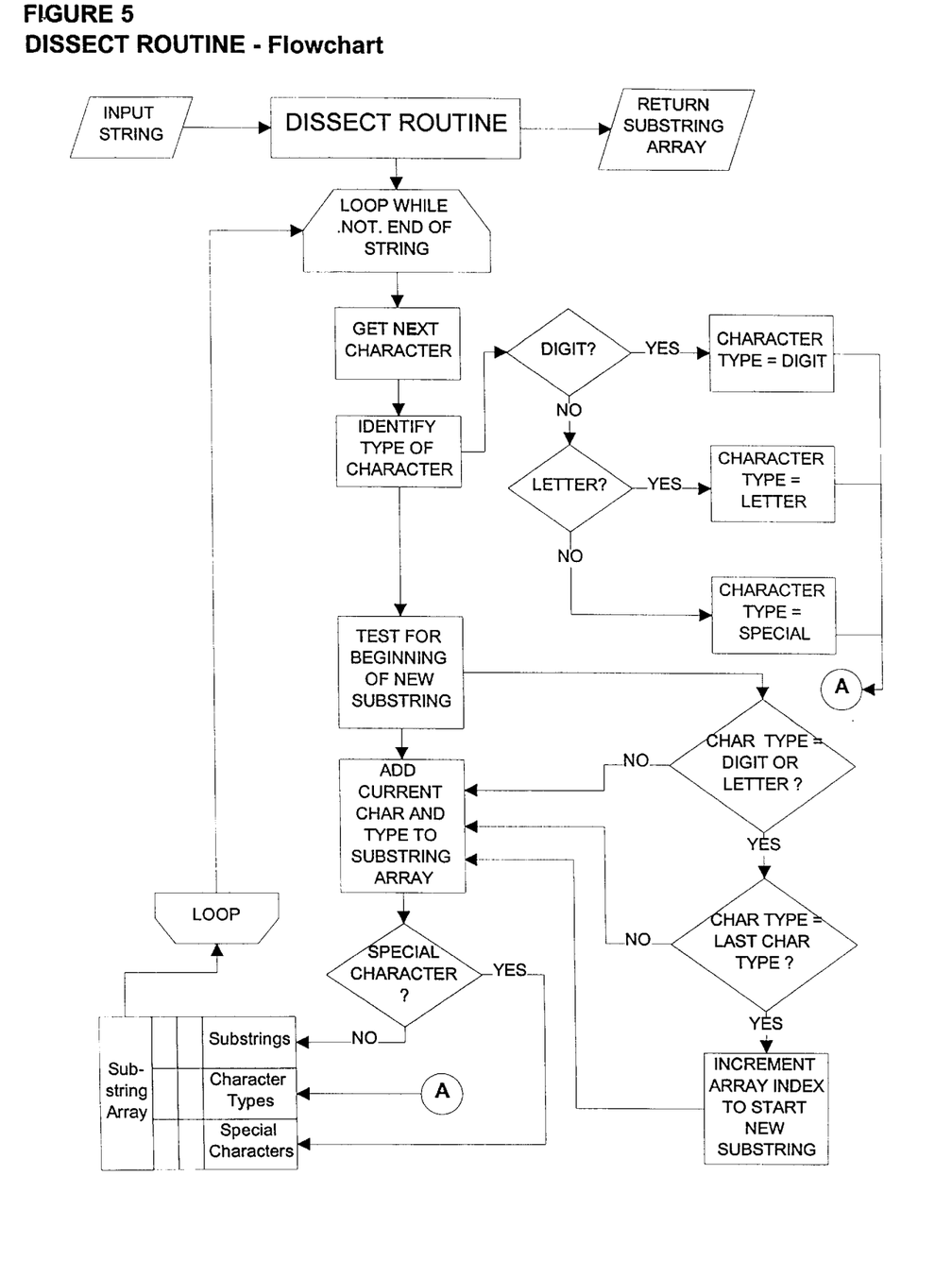
FIG. 5 is the detailed flow chart of the DISSECT Routine as shown in FIG. 2.
Figure 6:
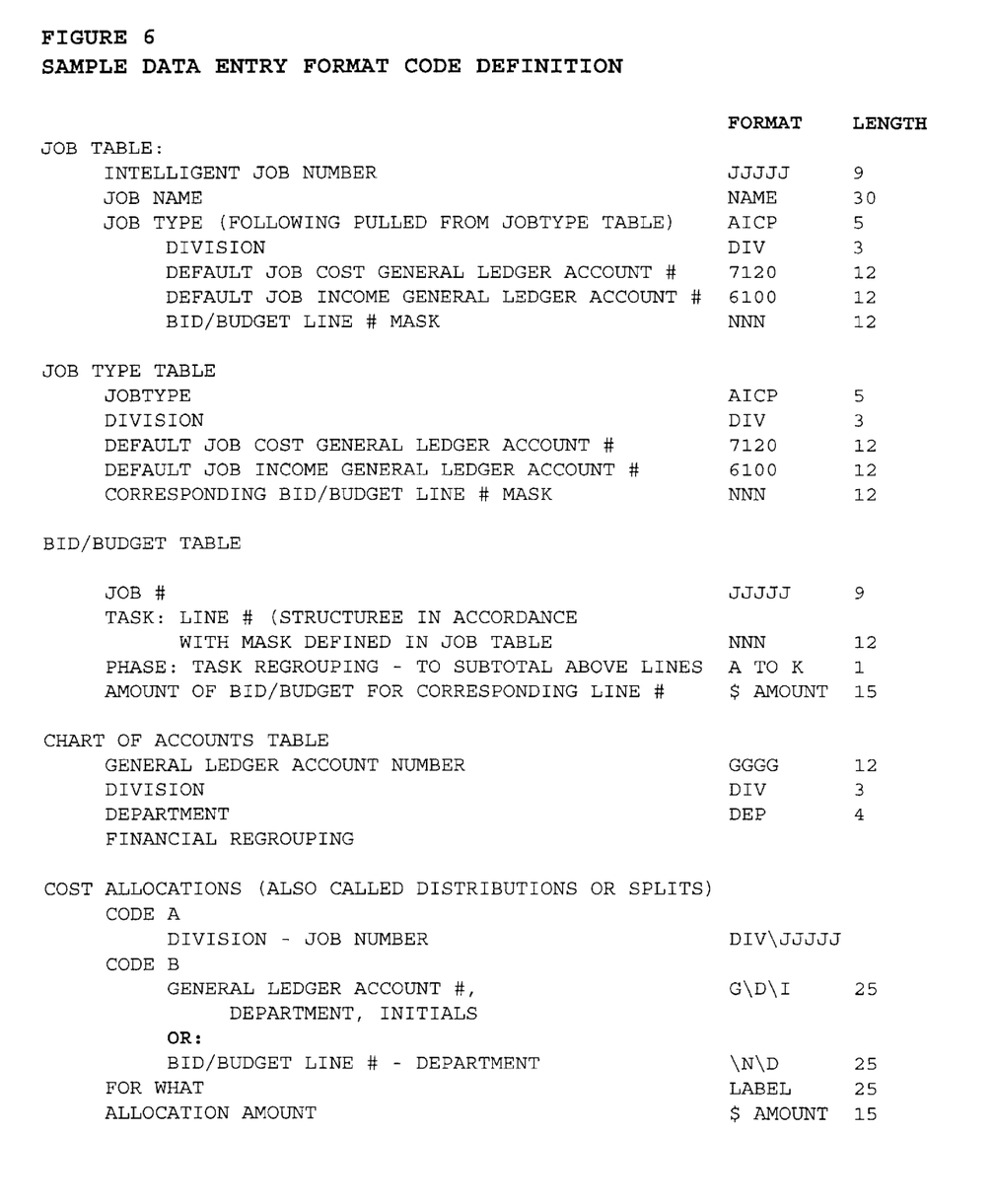
FIG. 6 is a sample table of a possible set of parameters that the user will use in his Code A and Code B inputs.
Figure 7:
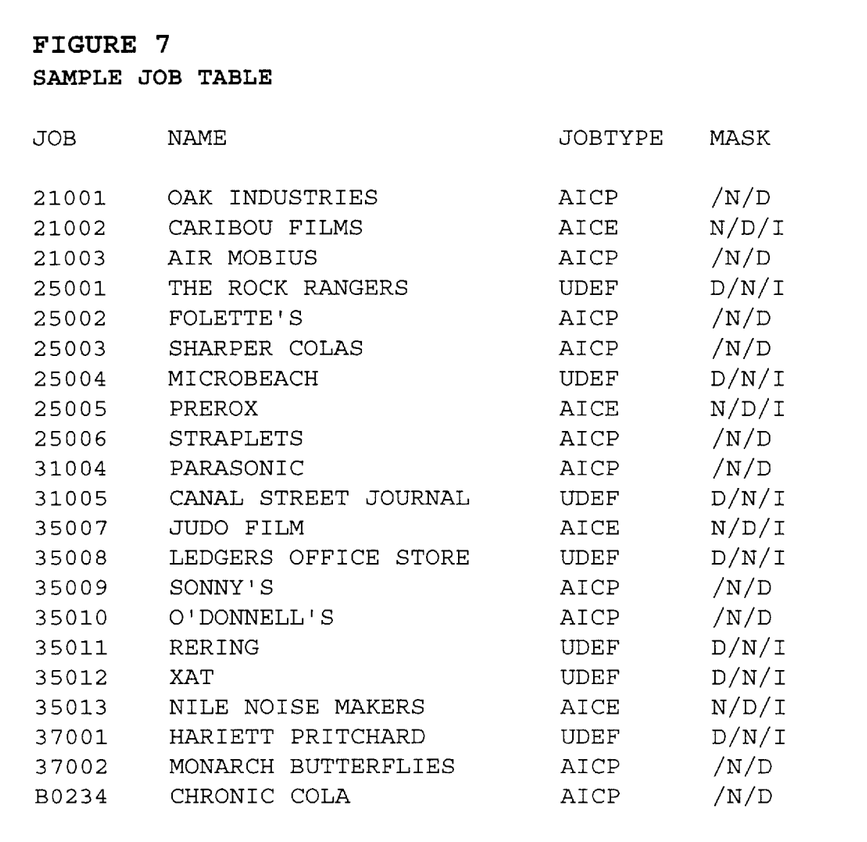
FIG. 7 is a sample table showing jobs by name and the job number and job type associated with each. Also included is a format mask which enables the PARSE B routine to interpret the data entered in the CODE B field to allow for different code formats to be used for each job or job type.

FIG. 5 is a flow chart illustrating the operation of the DISSECT routine, mentioned above in connection with both the PARSE_A and PARSE_B routines. A character string composed of letters, numbers, and/or special characters (#, /, \, |) is accepted as input. A "loop" is used to analyze each character in the string, and the routine is terminated after the last character has been interpreted.

Figure 8:
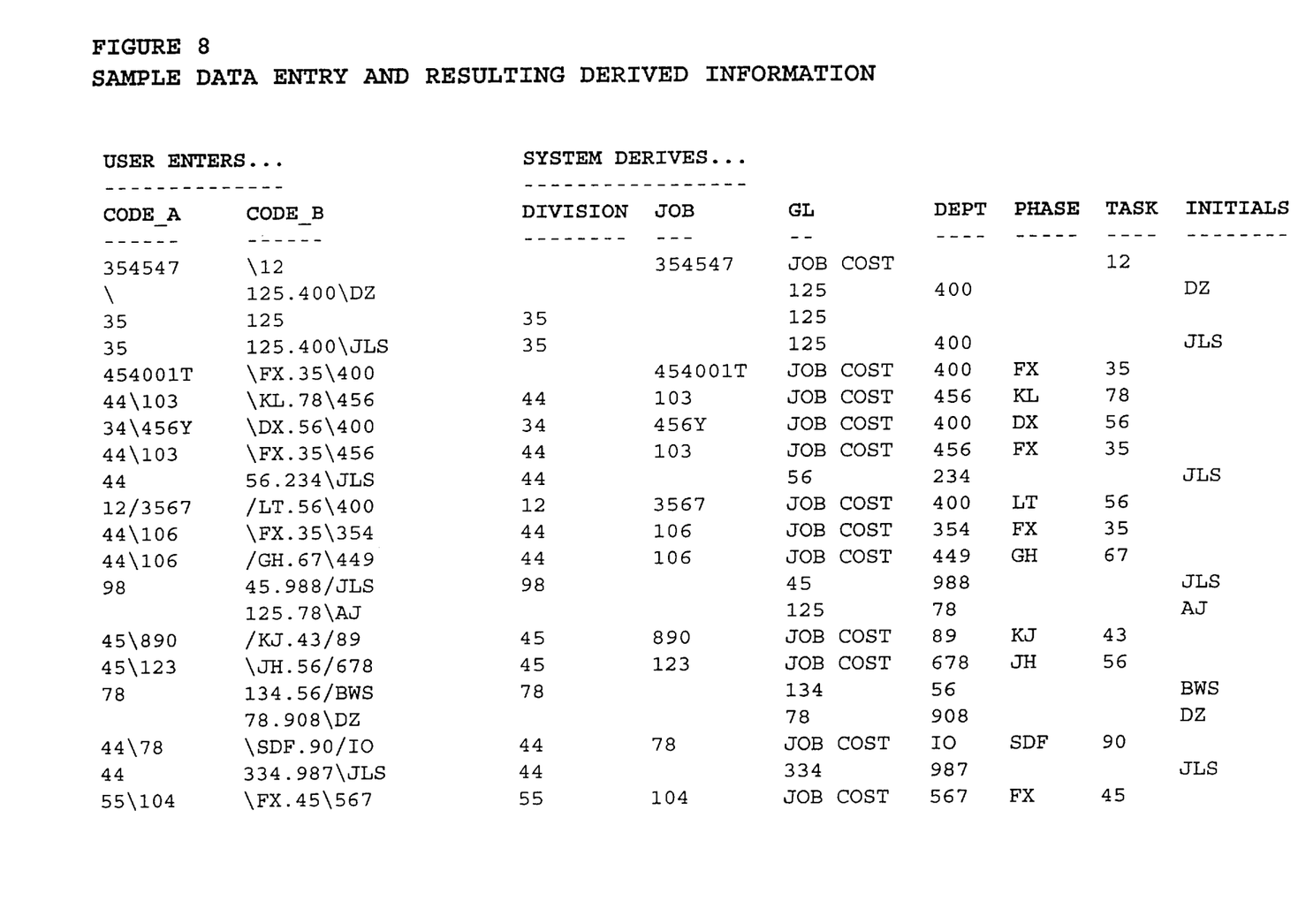
FIG. 8 is a sample table of codes for codes A and B as input by users and the resulting information obtained from these codes and displayed in the system by the algorithm of the present invention.

Each character in the string is identified according to it's type: letter, number, or special, and an identifying "flag" is stored in the array which will be returned to the parent routine. When a special character is encountered the system determines that the beginning of a new substring has been reached, and subsequent characters will be stored in a new position in the array; the special character itself is stored also. Letters and numbers are stored directly to the current substring in the array. The resulting array consists of a series of sub strings "parsed" from the original string accompanied by flags representing the character types and special characters which will help to identify the substring when returned to the parent routine; and FIG. 8 is a table illustrating sample entries into the CODE A and CODE B fields and the resulting information derived from that data by the system.

I do not limit myself to any particular details of construction set forth in the specifications and illustrated in the accompanying drawings, as the same refers to and sets forth only certain embodiments of the invention, and it is observed that the same may be modified without departing from the spirit and scope of the claimed invention.

I claim:

1. A method for organizing cost data for financial records pertaining to a project or job separately from the general ledger and for incorporating the job as a whole into a single general ledger entry in a system, the steps comprising:

Providing two related data entry fields and entering a first set of data into a first data entry field of said two related data entry fields and a second set of data into a second data entry field of said two related data entry fields, said first set of data representing either a blank field, a job number, a division, or a division and a job number, and said second set of data representing either general ledger information or job cost information so that said first set of data and said second set of data together represent either general ledger information or job cost information;

storing said first set of data and said second set of data into data structures called tables by means of one of either disk storage means or modem transmission means to transmit to remote system locations;

analyzing and obtaining significant data information from each of said data sets for parsing, which includes the steps of separating job cost information from general ledger information and interpreting job cost information to permit use of different user defined numbering systems which are entered into said second data entry field; and generating one of either a general ledger report which gathers and summarizes data information related to a particular job and includes that information as a single entry in the report or a detailed job cost report which gathers all phases and tasks of each job.

2. The method according to claim 1 wherein the first data entry field is provided to enter data of the first data set which either contains division information and job number information or is left empty, wherein said division information is information identifying an organizational unit of a business entity and said job information is information identifying a particular job by a unique alphanumeric code;

a second data entry field is provided to enter data of a second data set which is dependent upon the contents of the first data set such that if the first data set contains division and job number information then the system determines that the data of the second data entry field relates to job cost information and the second data set may contain bid/budget and line number information related to that job; if the first data set is left empty then the system determines that the data of the second data entry field relates to general ledger information and the second data set contains general ledger information including general ledger number and department code and initials of key people.

3. The method according to claim 1 wherein said first and second data sets are encoded in computer character strings and are analyzed and validated using algorithmic means to obtain significant information which is then made available for processing by the system.

4. The method according to claim 3 wherein said algorithmic means includes separate software routines for analyzing the first data set and second data set respectively.

5. The method according to claim 3 wherein said algorithmic means includes a software routine which separates the said computer character strings into component character strings for individual identification and which is utilized by each of the said software routines for the first data set and second data set.

6. The method according to claim 1 wherein software routines employ algorithmic means to separate data sets including general ledger information from data sets including job cost information and to gather and summarize job cost information into a single entry for inclusion in the general ledger report.

7. The method according to claim 1 wherein software routines employ algorithmic means to interpret job cost information for different user-defined numbering systems during data entry.

8. The method according to claim 1 wherein data structures called tables are provided for the storage of the said first and second data sets and wherein said first and second data sets are organized and stored in said tables.

9. The method according to claim 1 wherein said tables are stored using means including hard disk drives, floppy disks and compact disks.

10. The method according to claim 1 wherein said providing step includes entering information from said first set of data and said second set of data by bar coding means.

11. The method according to claim 1 wherein said first set of data and said second set of data transmitted by said modem means are subsequently stored on disk storage means at said remote system locations.

12. The method according to claim 1 wherein said report is either printed on paper or displayed on a computer monitor.

13. A system for organizing cost data for financial records pertaining to a project or job separately from the general ledger and for incorporating the job as a whole into a single general ledger entry in the system, comprising:

two related data entry fields including a first data entry field representing either a blank field, a job number, a division or a division and a job number of said two related data entry fields having a first set of data entered therein, and a second data entry field of said two related data entry fields representing either general ledger information or job cost information and having a second set of data which is entered therein, so that said first set of data and said second set of data together represent either general ledger information or job cost information;

data structures called tables into which said first set of data and said second set of data, means for storing said first set of data and said second set of data into said data structures called tables, said means for storing including of one of either disk storage means, magnetic storage means, or modem transmission means to transmit to remote system locations;

means for analyzing and obtaining significant data information from each of said data sets to allow for parsing, which includes means for separating job cost information from general ledger information and means for interpreting job cost information to permit use of different user defined numbering systems which are entered into said second data entry field; and means for generating a either one of a general ledger report which gathers and summarizes data information related to a particular job and includes that information as a single entry in the report or a detailed job cost report which gathers all phases and tasks of each job.

14. The system according to claim 13 wherein said first and second data sets are encoded in computer character strings and further comprising algorithmic means for analyzing and validating said computer character strings to obtain significant information which is then made available for processing the system.

15. The system according to claim 14 wherein said algorithmic means includes separate software routines for analyzing the first data set and second data set respectively.

16. The system according to claim 14 wherein said algorithmic means includes a software routine which separates the said computer character strings into component character strings for individual identification and which is utilized by each of the said software routines for the first data set and the second data set.

17. The system according to claim 13 wherein the first data entry field is structured to permit entry of the first data set which either contains division information and job number information or is left empty, wherein said division information is information identifying an organizational unit of a business entity and said job information is information identifying a particular job by a unique alphanumeric code;

a second data entry field is structured to enter data of a second data set which is dependant upon the contents of the first data set such that in a first mode if the first data set contains division and job number information then the system determines that the data relates to job cost information and the second data set may contain bid/budget and line number information related to that job; in a second mode if the first data set is left empty then the system determines that the data relates to general ledger information and the second data set may contain general ledger information including general ledger number and department code and initials of key people.

18. The system according to claim 13 further comprising software routines which employ algorithmic means to separate data sets including general ledger information from data sets including job cost information and to gather and summarize job cost information into a single entry for inclusion in the general ledger report.

19. The system according to claim 13 further comprising software routines which employ algorithmic means to interpret job cost information for different user-defined numbering systems during data entry.

20. The system according to claim 13 wherein data structures called tables are provided for the storage of the said first and second data sets and wherein said first and second data sets are organized and stored in said tables.

21. The system according to claim 13 further comprising storage means for storing said tables, said storage means including hard disk drives, floppy disks and compact disks.

22. The system according to claim 13 wherein said providing step includes entering information from said first set of data and said second set of data by bar coding means.

23. The system according to claim 13 wherein said first set of data and said second set of data transmitted by said modem means are subsequently stored on disk storage means at said remote system locations.

24. The system according to claim 13 wherein said report is either printed on paper or displayed on a computer monitor.

* * * * *